(12) United States Patent
Rippe et al.

(10) Patent No.: US 11,743,525 B2
(45) Date of Patent: Aug. 29, 2023

(54) METHODS AND SYSTEMS FOR DYNAMICALLY LOADING CONTENT ONTO IN-VEHICLE CONTENT-DELIVERY SYSTEMS

(71) Applicant: GOGO BUSINESS AVIATION LLC, Broomfield, CO (US)

(72) Inventors: Christopher M. Rippe, Arvada, CO (US); Ian Simpson, Erie, CO (US); Grant Burton, Westminster, CO (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 0 days.

(21) Appl. No.: 17/356,615

(22) Filed: Jun. 24, 2021

(65) Prior Publication Data
US 2022/0417582 A1  Dec. 29, 2022

(51) Int. Cl.
*H04N 21/414*  (2011.01)
*G06F 8/65*  (2018.01)
(Continued)

(52) U.S. Cl.
CPC ......... *H04N 21/41422* (2013.01); *G06F 8/65* (2013.01); *H04L 67/12* (2013.01); *H04N 21/433* (2013.01); *H04N 21/44222* (2013.01)

(58) Field of Classification Search
CPC ......... H04N 21/2146; H04N 21/41422; H04N 21/632; H04N 7/18; H04N 21/2225; H04N 21/4126; H04N 21/47211; H04N 21/44209; H04N 21/4622; H04N 21/2543; H04N 21/43632; H04N 21/6193; H04N 7/17318;
(Continued)

(56) References Cited

U.S. PATENT DOCUMENTS 7,328,012 B2  2/2008  Ziarno et al.
8,934,893 B2  1/2015  Lauer
(Continued)

FOREIGN PATENT DOCUMENTS

JP         2009296309 A    12/2009
WO    WO-2009/097043 A1   8/2009

OTHER PUBLICATIONS

International Application No. PCT/US2022/027265, International Search Report and Written Opinion, dated Aug. 8, 2022.

*Primary Examiner* — Omar S Parra
(74) *Attorney, Agent, or Firm* — Marshall, Gerstein & Borun LLP; Randall G. Rueth

(57) ABSTRACT

An example system includes an in-vehicle content-delivery system (CDS) on a vehicle storing a library of content, and a content server including a content portal. The content portal may receive a request for a customized content manifest from the CDS, identify the vehicle, identify a customized content manifest, and provide the customized content manifest to the CDS. The customized content manifest may include a list of content customized for an itinerary and/or the vehicle, and wherein the customized content manifest differs from another content manifest customized for a different itinerary and/or a different vehicle. The CDS may remove first content from the library of content when the first content is not included in the list of content, and load second content to the library of content when the second content is included in the list of content and not already present in the library of content.

20 Claims, 6 Drawing Sheets

(51) Int. Cl.
*H04L 67/12* (2022.01)
*H04N 21/433* (2011.01)
*H04N 21/442* (2011.01)

(58) Field of Classification Search
CPC ...... H04N 7/22; H04N 21/00; H04N 21/2221; H04N 21/23103; H04N 21/4363; H04N 21/4367; H04N 21/4383; H04N 21/47202; H04N 21/4782; H04N 21/4786; H04N 21/6125; H04N 21/6143; H04N 21/6175; H04N 21/214; H04N 21/2182; H04N 21/23106; H04N 21/23109; H04N 21/238; H04N 21/2393; H04N 21/2402; H04N 21/2407; H04N 21/242; H04N 21/26216; H04N 21/266; H04N 21/4122; H04N 21/41265; H04N 21/433; H04N 21/43615; H04N 21/43637; H04N 21/8456; H04N 21/21; H04N 21/2181; H04N 21/2223; H04N 21/23; H04N 21/25; H04N 21/262; H04N 21/26291; H04N 21/2665; H04N 21/2743; H04N 21/414; H04N 21/41407; H04N 21/418; H04N 21/4223; H04N 21/42684; H04N 21/4331; H04N 21/4332; H04N 21/4408; H04N 21/44204; H04N 21/4424; H04N 21/458; H04N 21/47815; H04N 21/6181; H04N 21/6405; H04N 21/64738; H04N 21/6581; H04N 21/8126; H04N 21/8166
See application file for complete search history.

(56) References Cited

U.S. PATENT DOCUMENTS

| | | |
|---|---|---|
| 9,287,999 B2 | 3/2016 | Lauer |
| 9,426,650 B2 | 8/2016 | Bangole et al. |
| 10,512,118 B2 | 12/2019 | Lauer |
| 2005/0256616 A1* | 11/2005 | Rhoads .................. H04L 69/329 701/1 |
| 2014/0279019 A1* | 9/2014 | Cheney .................. H04L 67/06 705/14.62 |
| 2019/0356713 A1* | 11/2019 | Demange .............. H04L 67/568 |
| 2020/0068654 A1 | 2/2020 | Lauer |

* cited by examiner

METHODS AND SYSTEMS FOR DYNAMICALLY LOADING CONTENT ONTO IN-VEHICLE CONTENT-DELIVERY SYSTEMS

FIELD OF THE DISCLOSURE

The present disclosure generally relates to content-delivery, and, in particular, to methods and systems for dynamically loading content onto in-vehicle content-delivery systems.

BACKGROUND

Traditionally, in-vehicle entertainment content is manually loaded onto in-vehicle content-delivery systems that are located in each vehicle (e.g., aircraft) via portable media (e.g., USB sticks) while the vehicles are parked at airport gates. Thus, every inflight entertainment content update requires a visit to a vehicle by maintenance personnel. Two weaknesses with this method are the cost and time it takes to create new portable media sticks, distribute the portable media, and manually load the portable media in all of the vehicles of a carrier. This is an expensive and inefficient process, which prevents timely in-vehicle entertainment content delivery. In addition, the coordination of these in-vehicle entertainment content deliveries is complex and prone to human error, especially because the vehicles are transient and can be rerouted to meet the needs of the carrier, for weather/maintenance events, etc. Moreover, to have personalized content databases requires customized portable media be generated, distributed and manually loaded for each desired permutation. Therefore, there is a need for methods and systems for dynamically loading content onto in-vehicle content-delivery systems.

SUMMARY

Methods and systems for dynamically loading content onto in-vehicle content-delivery systems are disclosed herein.

In one embodiment, a system for dynamically loading content to an in-vehicle content-delivery system for distribution on a vehicle includes an in-vehicle content-delivery system storing a library of content, and a content server including a content portal. The content portal may be configured to receive a request for a customized content manifest from the in-vehicle content-delivery system, identify the vehicle, identify a customized content manifest for an itinerary for the vehicle and/or the vehicle, and provide the customized content manifest to the in-vehicle content-delivery system. The customized content manifest may include a list of content, wherein the customized content manifest is customized for the itinerary and/or the vehicle, and wherein the customized content manifest differs from another content manifest customized for a different itinerary and/or a different vehicle. The in-vehicle content-delivery system may be configured to, remove first content from the library of content when the first content is not included in the list of content, and load second content to the library of content when the second content is included in the list of content and not already present in the library of content.

In variations of this embodiment, the in-vehicle content-delivery system is configured to notify the content server when the second content is successfully loaded to the library of content.

In variations of this embodiment, the list of content includes third content, the customized content manifest includes content priorities, and the in-vehicle content-delivery system is configured to install the second and third content to the library of content in an order that is based on the content priorities.

In variations of this embodiment, the content server further includes a content loader configured to preload the second content to the content server, and the in-vehicle content-delivery system is configured to load the second content from the content server.

In variations of this embodiment, the in-vehicle content-delivery system is configured to load the second content from a content source identified in the list of content.

In variations of this embodiment, the system further comprises a data center configured to receive one or more content selections, identify the vehicle and/or the itinerary for the vehicle, identify the customized content manifest for the vehicle and/or the itinerary, and update the customized content manifest based upon the one or more content selections.

In variations of this embodiment, the data center is configured to provide the customized content manifest to the content server.

In variations of this embodiment, the second content includes a software update, and the content server is configured to notify maintenance personnel when the software update is loaded into the library of content and is ready to be installed in the vehicle or in a system of the vehicle.

In variations of this embodiment, the second content includes configuration data, and the content server is configured to notify maintenance personnel when the configuration data is loaded into the library of content and is ready to be applied to the vehicle or to a system of the vehicle.

In variations of this embodiment, the second content includes at least one of a magazine, a news feed, web data, an application, audio content, video content, or multimedia content.

In another embodiment, a computer-implemented method for dynamically loading content to an in-vehicle content-delivery system for distribution on a vehicle may include: receiving, via a network, a request for a customized content manifest from an in-vehicle content-delivery system on a vehicle; identifying, using one or more processors, the vehicle; identifying, using the one or more processors, a customized content manifest for an itinerary for the vehicle and/or the vehicle, wherein the customized content manifest includes a list of content, wherein the customized content manifest is customized for the itinerary and/or the vehicle, and wherein the customized content manifest differs from another content manifest customized for a different itinerary and/or different vehicle; and providing, via the network, the customized content manifest to the in-vehicle content-delivery system, wherein the in-vehicle content-delivery system is configured to remove first content from a library of content stored on the vehicle when the first content is not included in the list of content, and load second content to the library of content when the second content is included in the list of content and not already loaded to the in-vehicle content-delivery system.

In variations of this embodiment, the method further comprises receiving notifications from the in-vehicle content-delivery system when the second content is successfully loaded to the in-vehicle content-delivery system.

In variations of this embodiment, the list of content includes third content, and the customized content manifest includes content priorities that represent an order in which the in-vehicle content-delivery system is to load the second and third content.

In variations of this embodiment, the method further comprises preloading the second content to a content server, and loading the second content to the in-vehicle content-delivery system from the content server.

In variations of this embodiment, the list of content identifies a content source for the second content.

In variations of this embodiment, the method further comprises receiving one or more content selections, and updating the customized content manifest based upon the one or more content selections.

In variations of this embodiment, the second content includes at least one of a software update or configuration data, and the method further includes notifying maintenance personnel when the at least one of the software update or the configuration data is loaded by the in-vehicle content-delivery system into the library of content and is ready to be installed in the vehicle or in a system of the vehicle.

In yet another embodiment, a non-transitory computer-readable medium stores instructions that, when executed by one or more processors, cause a system to: receive, via a network, a request for a customized content manifest from an in-vehicle content-delivery system on a vehicle; identify the vehicle; identify a customized content manifest for an itinerary for the vehicle and/or the vehicle, wherein the customized content manifest includes a list of content, wherein the customized content manifest is customized for the itinerary and/or the vehicle, and wherein the customized content manifest differs from another content manifest customized for a different itinerary and/or different vehicle; and provide, via the network, the customized content manifest to the in-vehicle content-delivery system, wherein the in-vehicle content-delivery system is configured to remove first content from a library of content stored on the vehicle when the first content is not included in the list of content, and load second content to the library of content when the second content is included in the list of content and not already loaded to the in-vehicle content-delivery system.

In variations of this embodiment, the list of content includes third content, and the customized content manifest includes content priorities that represent an order in which the second and third content are to be loaded.

In variations of this embodiment, the second content includes at least one of a software update or configuration data, and the instructions, when executed by the one or more processors, cause the system to notify maintenance personnel when the at least one of the software update or the configuration data is loaded by the in-vehicle content-delivery system into the library of content and is ready to be installed in the vehicle or in a system of the vehicle.

Figure 1:
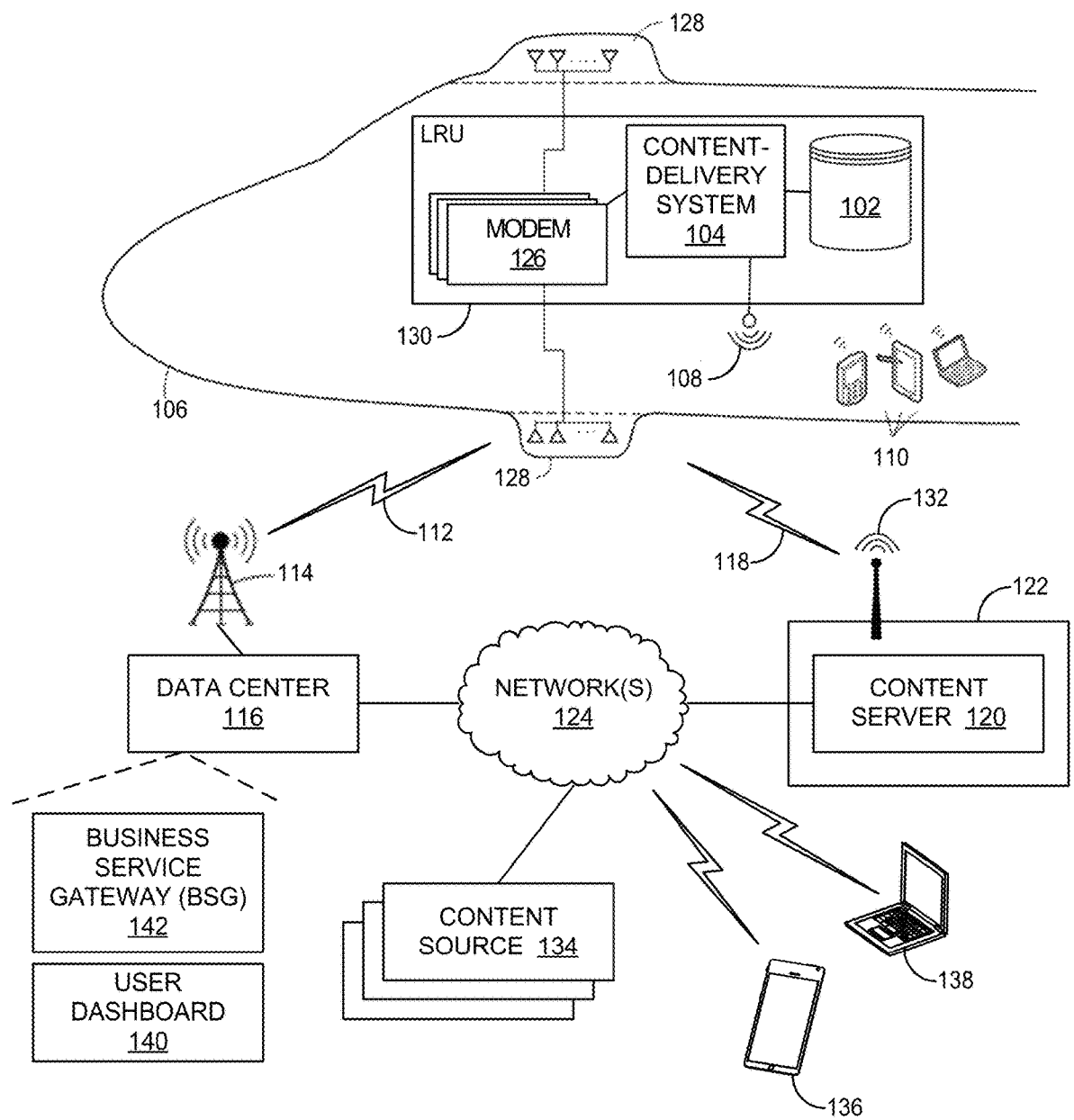
FIG. 1 is a block diagram of an example system for dynamically loading content onto in-vehicle content-delivery systems, in accordance with disclosed embodiments.

The figures depict embodiments of this disclosure for purposes of illustration only. One skilled in the art will readily recognize from the following discussion that alternate embodiments of the structures and methods illustrated herein may be employed without departing from the principles set forth herein.

In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

For simplicity and clarity of explanation the following description refers to an aircraft and the dynamic loading of content to an in-vehicle content-delivery system on the aircraft via a wireless content server (e.g., Wi-Fi™ based) located at a facility operated by a fixed-based operator (FBO). However, one of ordinary skill in the art will recognize that the embodiments disclosed herein may be used to dynamically load content to in-vehicle content-delivery systems on any type of vehicle (e.g., an airplane, ship, train, bus, etc.) via wired or wireless content servers at any type of facility (e.g., an airport, gate, hanger, port, station, depot, etc.). A vehicle may be configured for travel by land, sea, air, or some combination thereof. Generally speaking, a vehicle is any machine capable of conveying cargo and/or passengers from one location to another. A vehicle may be used to transport passengers who pay for, or are otherwise granted, passage on the vehicle. The owner and/or operator of a vehicle may be an individual or some other entity, such as a business entity or governmental entity. In some embodiments, a vehicle may be one of a fleet of vehicles and/or may be used to transport live or inanimate cargo, packages, mail, and/or other types of passengers or cargo.

For simplicity and clarity of explanation, the following description refers to a single aircraft and a single FBO facility and content server. However, one of ordinary skill in the art will recognize that the embodiments disclosed herein may be used to dynamically load content to any number of in-vehicle content-delivery systems on any number of vehicles from any number of content servers at any number of locations.

The aircraft 106 may be a personal, business or commercial passenger airplane owned or leased by an airline company, and the airline company may be a content provider (e.g., the airline may license content and provide the content to the passengers). Additionally and/or alternatively, the airline company may not be a content provider, but may cooperate with a content provider that provides equipment, services, licenses, and/or content to facilitate content delivery to passengers on airplanes operated by the airline company.

As disclosed, by utilizing the Wi-Fi capabilities of an in-vehicle content-delivery system on a vehicle, which can be an aircraft, content can be automatically and dynamically loaded onto the in-vehicle content-delivery system whenever the aircraft is at a FBO's facility, avoiding the loading of content via portable media. By loading content wirelessly via a content server at an FBO's facility and its live internet connection, the content loaded onto a particular in-vehicle content-delivery system can be customized, personalized, etc. based on configuration. For example, algorithms may be used to determine what content should be loaded based on content priority, space limitations, and partially transferred content. After content is transferred, its status may be reported back to the content server so the content server knows what content is loaded on each aircraft. Moreover, having a content server at an FBO's facility, with the ability to move part of a content catalog at a time, allows for an in-vehicle content-delivery system to stay up to date with the latest content without maintenance personnel having to do anything. Because, in disclosed examples, the in-vehicle content-delivery system uses a manifest provided by the content server to control the loading of content, the content loaded onto the content-delivery system of a vehicle can be personalized to that aircraft, an itinerary for that aircraft, etc.

Reference will now be made in detail to non-limiting examples, some of which are illustrated in the accompanying drawings.

System 100

FIG. 1 illustrates an example system 100, according to an embodiment, for dynamically loading content onto a content library 102 (e.g., stored on a non-transitory computer-readable medium) of an example in-vehicle content-delivery system 104 on a vehicle, which can be an aircraft 106. The aircraft 106 may be associated with one or more communication networks and/or links. For example, (i) a communication network 108 to provide communication services to electronic devices 110 while the electronic devices 110 are disposed within the aircraft 106, (ii) a communication link 112 between the aircraft 106 and a terrestrial base station 114 connected to a data center 116, and (iii) a communication link 118 between the aircraft 106 and a content server 120 at an FBO's facility 122 while the aircraft 106 is at the FBO's facility 122.

The content-delivery system 104 is configured to, among other things, deliver content from the content library 102 to the electronic devices 110 via the communication network 108. The electronic devices 110 may include any mobile computing device, such as a smartphone, a tablet, a laptop computer, a personal digital assistant, an e-reader, smart glasses, smart watches, or any other mobile computing device capable of wireless communications. The content-delivery system 104 may deliver content to the electronic devices 110 regardless of its connection to an external network 124 such as the Internet, the content server 120, etc.

The content-delivery system 104 is further configured to provide an interface to the electronic devices 110 via the network 108 to view a list of content, select content, view content, download content, purchase content and/or otherwise access content from the content library 102.

As used herein, content includes, but is not limited to, media content, which may include audio and/or visual information. Typical examples of media content include movies, television shows, songs, video games, digital magazines, news feeds, web data, applications, or any other content involving textual, audio and/or visual presentation. In other words, content may include anything that can be provided as output at a display component (e.g., a screen) and/or an audio component (e.g., a speaker) of an electronic device. Content may also include software, configuration data, files, etc. that may be installed in, applied to, made available (e.g., as a file server) via the aircraft 106 or a system of the aircraft 106 (e.g., a line replaceable unit (LRU) 130) by, for example, maintenance personnel.

Although the communication link 112 is depicted as a communication link of an air-to-ground (ATG) network and referred to herein in the singular tense, it should be appreciated that other network configurations are envisioned. For example, the communication link 112 may be a satellite-based communication link, etc. Furthermore, in some embodiments, multiple communication links 112 may be associated with the aircraft 106, e.g., the aircraft 106 may be communicatively connected to both an ATG communication link 112 and a satellite-based communication link 112.

To this end, a vehicle, which can be the aircraft 106, may contain one or more modems 126 configured to be compatible with a plurality of different communication standards utilized by the ATG communication link 112 and/or the communication link 118. For example, the communication links 112, 118 may utilize communication protocols associated with terrestrial communications (e.g., TDMA, GSM, CDMA, LTE, WiMAX, Wi-Fi, etc.) and/or associated with frequencies in the $K_a$ band, the $K_u$ band, the L band, and/or any other suitable wireless communication frequency bands. Each of the plurality of modems 126 may be connected to at least one respective antenna 128. The modems 126, the content-delivery system 104 and the content library 102 may be implemented within a line replaceable unit (LRU) 130.

Generally speaking, the communication network 108 is a network or group of networks disposed, managed, and/or hosted on-board the aircraft 106. The network 108 may include various nodes and links used for data and/or communication exchange between the nodes. In an embodiment, nodes of the network 108 may also communicate with nodes outside of the network 108 (via, e.g., the network 124). The network 108 may include one or more of: a wired network, a wireless network, or a network that uses a combination of wired and wireless technology. Further, the network 108 may include a public or a private network.

In an embodiment, the network 108 includes one or more access points that allow some or all of the electronic devices 110 to connect to the network 108. For example, the network 108 may include networking equipment such as routers, hubs, switches, repeaters, bridges, and/or gateway devices. Some of the networking equipment may utilize a spread spectrum paradigm and/or one or more RF bands (e.g., an ISM band, such as the 900 MHz band, 2.4 GHz band or 5 GHz band) to facilitate communication.

While not shown in FIG. 1 for clarity of illustration, the aircraft 106 may include electronic systems such as avionics systems (or equivalents for non-aircraft vehicles), such as communication systems, navigation systems, instrumentation, flight-control systems, or collision avoidance systems. The electronics system may also include non-avionics systems (e.g., electronics not specifically designed for use in an aircraft) such as control systems, data distribution devices, etc. As many of the electronics systems may require a degree of stability and/or secure attachment during transportation, at least some of the electronics systems may be included in an LRU that is fixedly or rigidly attached to the aircraft 106. Typically, an LRU is an electronic assembly that performs a specific function in the aircraft 106 and may be removed or replaced as a unit and serviced at a vehicle maintenance center. Some of the electronics systems may not be included in LRUs. For example, instead of being fixedly connected to the aircraft 106 via LRUs, some electronics systems may be fixedly connected to the aircraft 106 using some other means, such as a bracket or other connecting device.

Dynamic Loading of Content

When, for example, the aircraft 106 lands (e.g., when weight on wheels is detected), the example content-delivery system 104 begins searching for a wireless network 132 (e.g., a Wi-Fi network) provided by the content server 120. When the network 132 is detected, the content-delivery system 104 connects to the content server 120 via the network 132. The content-delivery system 104 requests a content manifest from the content server 120. The content manifest includes, among possibly other things, a list of content to be loaded into the content library 102, and content priorities representing the order in which content should be loaded into the content library 102. The list of content may include information representing from where the content can be obtained.

The content server 120 identifies the aircraft 106, an itinerary, a passenger, etc. associated with the aircraft 106. The content server 120 then identifies a particular content manifest customized, tailored, personalized, etc. for the identified aircraft, itinerary, passenger, etc., and provides the identified customized content manifest to the content-delivery system 104.

The content-delivery system 104 removes content from the content library 102 that is not included in the received content manifest. The content-delivery system 104 loads the content identified in the received content manifest according to the content priorities into the content library 102. For example, content may be loaded from the content server 120 (e.g., content preloaded for download by the content-delivery system 104) and/or from content sources 134 such as websites. If there is any partially loaded content, the content-delivery system 104 resumes those downloads. If there are any interruptions, the content-delivery system 104 saves partial downloads into the content library 102.

As content is successfully loaded into the content library 102, the content-delivery system 104 may notify the data center 116 via the content server 120, which maintains a database of which content is loaded onto the content-delivery system 104. Additionally and/or alternatively, the content-delivery system 104 may generate or update a local record (e.g., in a computer-readable storage medium accessible at the aircraft 106) of the content delivery performed by the content-delivery system 104.

When successfully loaded content is a software update, configuration data, files, etc., that may be installed in, applied to, made available (e.g., as a file server) via the aircraft 106 or a system of the aircraft 106 (e.g., the LRU 130) by, for example, maintenance personnel, the content server 120 and/or the data center 116 may notify maintenance personnel such that the software update, configuration data, files, etc. are available.

In disclosed embodiments, the content manifest provided to the content-delivery system 104 by the content server 120 is customized for the aircraft 106, for an itinerary associated with the aircraft 106, for an owner of the aircraft 106, for an operator of the aircraft 106, to include purchased upgrades, for domestic vs. international flights, to include personal content published to the content server 120 and/or an available content source 134, to include content published by a third party to the content server 120 and/or an available content source 134, etc. Thus, the content manifest provided to the content-delivery system 104 may differ from the content manifest provided to another content-delivery system on a different aircraft. Moreover, different content manifests may be provided to the content-delivery system 104 at different times depending upon a next upcoming itinerary, passenger, etc.

A content manifest customized, tailored, personalized, etc. for a particular aircraft, itinerary, passenger, fleet, owner, etc. may be created, updated, modified, etc. by an owner, passenger, third party, etc. using an electronic device 136, 138 via a user dashboard 140 provided by the data center 116, and/or by an operator, partner, etc. using an electronic device 136, 138 via a business service gateway (BSG) 142 provided by the data center 116. For example, a user many provide first inputs that can be used to identify a particular aircraft, itinerary, passenger, fleet, owner, etc. and then provide second inputs that can be used to identify content that should be loaded onto an in-vehicle content-delivery system 104 for the identified aircraft, itinerary, passenger, fleet, owner, etc.

Content-Delivery System

Figures 2, 3:
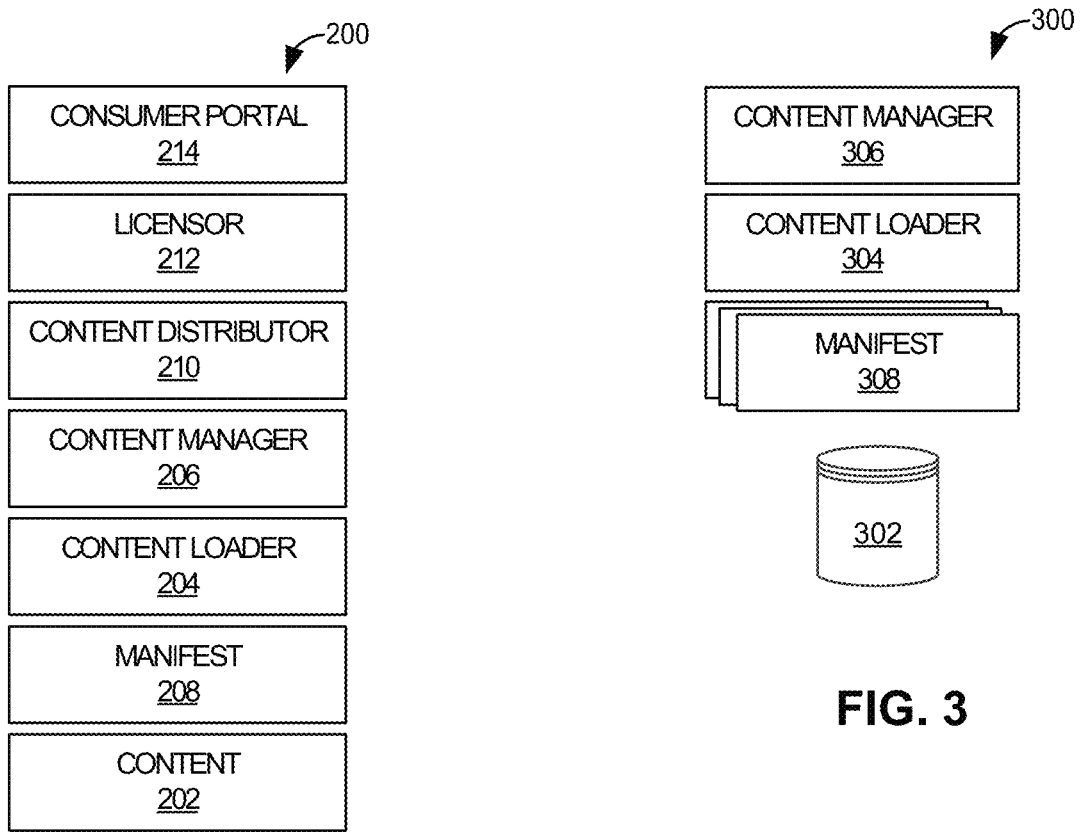
FIG. 2 is a block diagram illustrating an example implementation of the example content-delivery system of FIG. 1, in accordance with disclosed embodiments.
FIG. 3 is a block diagram illustrating an example implementation of the example content server of FIG. 1, in accordance with disclosed embodiments.

FIG. 2 is a block diagram illustrating an example content-delivery system 200 that may be used to implement the content-delivery system 104 of FIG. 1, in accordance with disclosed embodiments.

To dynamically load content 202 to the content library 102, the example content-delivery system 200 includes an example content loader 204. The content loader 204 is device with an interface capable of establishing a communication link with another device or system (generally for the purpose of receiving content to be loaded to a vehicle, which can be the aircraft 106). For example, the content loader 204 may include an interface for establishing a wired or wireless communication link with the content server 120, the content source(s) 134, etc. for loading the content 202 onto the content-delivery system 104. Additionally, the content loader 204 may include a physical interface, such as a universal serial bus (USB) interface, that is utilized by a physical source devices (e.g., a USB memory stick) to load content to the content library 102.

To manage the (un)loading of content 202 to/from the content library 102, the example content-delivery system 200 includes an example content manager 206. When, for example, an aircraft 106 including the content-delivery system 200 lands (e.g., when weight on wheels is detected), the content manager 206 begins searching for a wireless network 132 (e.g., a Wi-Fi network) provided by a content server (e.g., the content server 120). When the network 132 is detected, the content manager 206 connects to the content server 120 via the network 132. The content manager 206 requests a content manifest 208 from the content server 120. The content manifest 208 includes, among possibly other things, a list of content to be loaded into the content library 102, and content priorities representing the order in which content should be loaded into the content library 102. The list of content may include information representing from where the content can be obtained.

The content manager 206 removes content from the content library 102 that is not included in the received content manifest 208. The content manager 206 directs the content loader 204 to load the content identified in the received content manifest 208 according to the content priorities into the content library 102. For example, content may be loaded from the content server 120 (e.g., content preloaded for download by the content-delivery system 104) and/or from content sources 134 such as websites. If there is any partially loaded content, the content loader 204 resumes those downloads. If there are any interruptions, the content loader 204 saves partial downloads into the content library 102.

As content is successfully loaded into the content library 102, the content manager 206 may notify the data center 116 via the content server 120, which maintains a database of which content is loaded onto the content-delivery system 200. Additionally and/or alternatively, the content manager 206 may generate or update a local record (e.g., in a computer-readable storage medium accessible at the aircraft 106) of the content delivery performed by the content-delivery system 200.

To provide the content 202 to the electronic devices 110, the content-delivery system 200 includes an example content distributor 210. The content distributor 210 may be utilized by the content-delivery system 200 to (i) receive content selection data from an electronic device 110, (ii) identify particular content 202 in the library 102 based on the received content selection data, (iii) retrieve the identified content 202 from the library 102, and (iv) transmit the retrieve content 202 via the communication interface 108 to the electronic device 110.

Generally speaking, the content distributor 210 grants or verifies authorization for the selected content (e.g., by initiating a payment process or verifying previous payment) before retrieving and sending the content to the electronic device 110. In some examples, a licensor 212 may handle the authorization process before the content distributor 210 proceeds with initiating a content delivery session to transmit content.

To facilitate interactions between the electronic devices 110 and the content-delivery system 200, the content-delivery system 200 includes an example consumer portal 214. The consumer portal 214 operates to provide an interface (e.g., a graphical user interface (GUI)) to the electronic devices 110, enabling users of the electronic devices 110 to select or request content for consumption. The consumer portal 214 may receive a content selection from the electronic devices 110, and instruct the content distributor 210 to deliver the selected content.

In certain embodiments, the consumer portal 214 may be (or may include) a web page and/or service that can be hosted by the content-delivery system 200 and made available to an electronic device 110. The content option data may be transmitted using such a web page and/or service to facilitate content selection at an electronic device 110. In addition to the content option data, the consumer portal 214 may transmit other data to facilitate content selection by an electronic device 110. For example, the consumer portal 214 may transmit graphic data, which may be utilized by the electronic device 110 to provide a content selection interface for a user. More particularly, the graphic data may specify a particular layout and/or particular image(s) to be provided as part of the content selection interface (e.g., a layout of a web page).

In some embodiments, the consumer portal 214 may interact with a client application at the electronic device 110. In some of these embodiments, the electronic device 110 may largely rely on the client application and locally stored data at the electronic device 110 to provide the content selection interface, requiring little from the consumer portal 214 other than content options.

While an example manner of implementing the content-delivery system 104 of FIG. 1 is illustrated in FIG. 2, one or more of the structures or methods illustrated in FIG. 2 may be combined, divided, re-arranged, omitted, eliminated and/or implemented in any other way. Further, the content loader 204, the content manager 206, the content distributor 210, the licensor 212, the consumer portal 214 and/or, more generally, the content-delivery system 200 of FIG. 2 may be implemented by hardware, software, firmware and/or any combination of hardware, software and/or firmware. Thus, for example, the content loader 204, the content manager 206, the content distributor 210, the licensor 212, the consumer portal 214 and/or, more generally, the content-delivery system 200 could be implemented by one or more of a digital or analog circuit, logic circuit, programmable processor, programmable controller, graphics processing unit (GPU), digital signal processor (DSP), application specific integrated circuit (ASIC), programmable logic device (PLD), field programmable gate array (FPGA), field programmable logic device (FPLD), etc. Further still, the content-delivery system 200 of FIG. 2 may include one or more structures or methods in addition to, or instead of, those illustrated in FIG. 2, and/or may include more than one of any or all of the illustrated structures and methods.

Content Server

FIG. 3 is a block diagram illustrating an example content server 300 that may be used to implement the content server 120 of FIG. 1, in accordance with disclosed embodiments.

To preload content to a content library 302 of the content server 300 for subsequent dynamic download to an in-vehicle content-delivery system (e.g., the content-delivery system 104), the example content server 300 includes an example content loader 304. The content loader 304 is device with an interface capable of establishing a communication link with another device or system (generally for the purpose of receiving content to preload). For example, the content loader 306 may include an interface for establishing a wired or wireless communication link with the content source(s) 134, etc. for loading content into the content library 302. Additionally, the content loader 304 may include a physical interface, such as a USB interface, that is utilized by a physical source devices (e.g., a USB memory stick) to preload content to the content library 302.

To manage the preloading of content to/from the content library 302, the example content server 300 includes an example content manager 306. When, for example, the content manager 306 receives a new content manifest 308 from the data center 116, the content manager 306 removes content from the content library 302 that is not included in any of the active manifests 308 held by the content server 300. The content manager 306 directs the content loader 304 to load the content identified in the received content manifest 308 according to the content priorities into the content library 302. If there is any partially loaded content, the content loader 304 resumes those downloads. If there are any interruptions, the content loader 304 saves partial downloads into the content library 302.

When the content server 300 receives a request for a content manifest from an in-vehicle content-delivery system 104 of a vehicle, which can be an aircraft 106, the content manager 306 identifies the aircraft 106, an itinerary, a passenger, etc. associated with the aircraft 106. The content manager 306 then identifies a particular content manifest 308 customized, tailored, personalized, etc. for the identified aircraft, itinerary, passenger, etc., and provides the identified customized content manifest 308 to the content-delivery system 104.

While an example manner of implementing the content server 120 of FIG. 1 is illustrated in FIG. 3, one or more of the structures or methods illustrated in FIG. 3 may be combined, divided, re-arranged, omitted, eliminated and/or implemented in any other way. Further, the content loader 304, the content manager 306 and/or, more generally, the content server 300 of FIG. 3 may be implemented by hardware, software, firmware and/or any combination of hardware, software and/or firmware. Thus, for example, the content loader 304, the content manager 306 and/or, more generally, the content server 300 could be implemented by one or more of a digital or analog circuit, logic circuit, programmable processor, programmable controller, GPU, DSP, ASIC, PLD, FPGA, FPLD, etc. Further still, the content server 300 of FIG. 3 may include one or more structures or methods in addition to, or instead of, those illustrated in FIG. 3, and/or may include more than one of any or all of the illustrated structures and methods.

Figure 4:
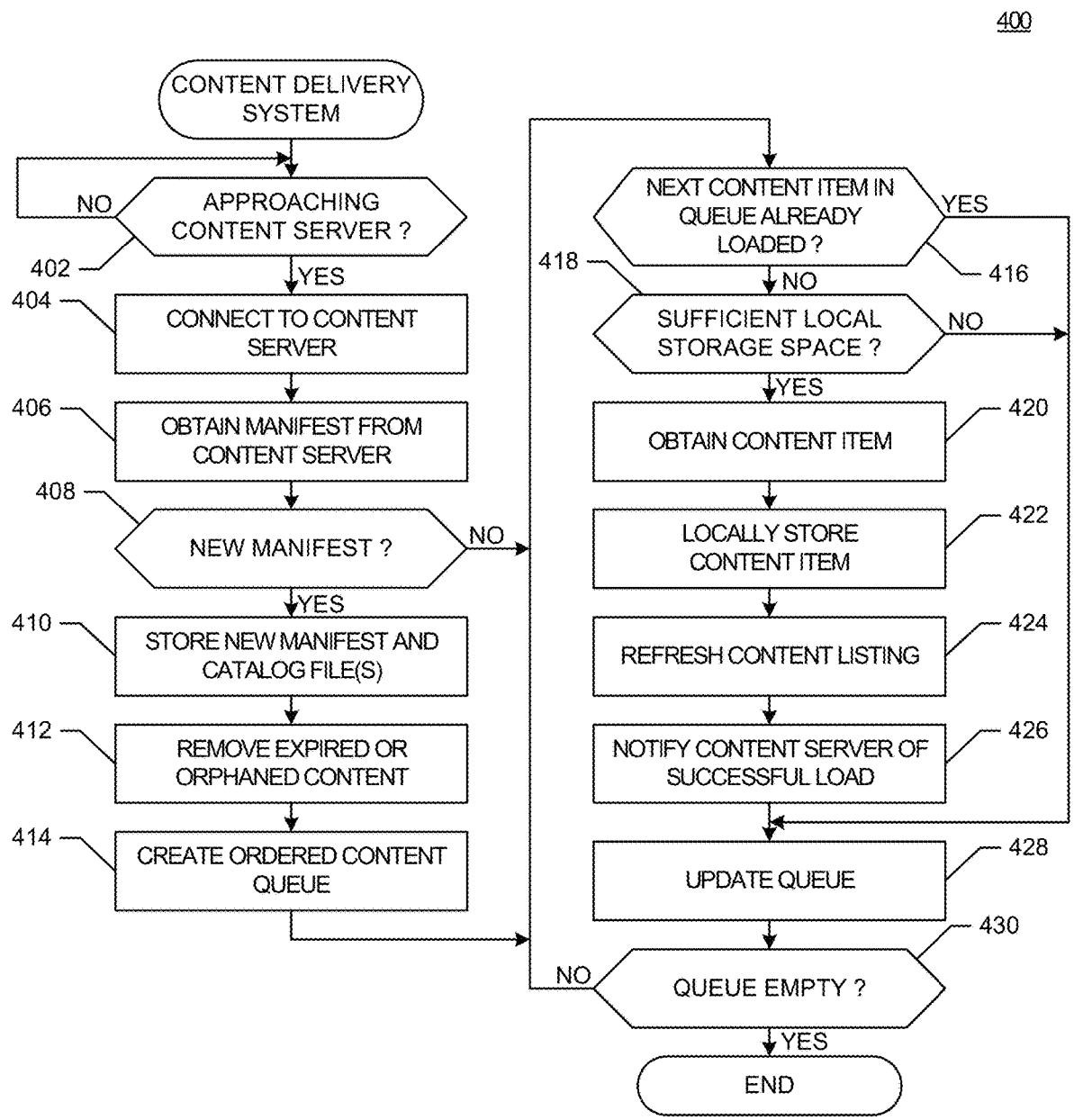
FIG. 4 is a flowchart representative of an example method, hardware logic, machine-readable instructions, or software for implementing the example content-delivery systems of FIGS. 1 and 2, in accordance with disclosed embodiments.

FIG. 4 is a flowchart 400 representative of example processes, methods, software, machine-readable instructions, etc. for implementing the content-delivery systems 104, 200. The processes, methods, software and instructions may be an executable program or portion of an executable program for execution by a processor such as the processor 702 of FIG. 7. The program may be embodied in software and/or machine-readable instructions stored on a non-transitory, machine-readable storage medium such as a compact disc (CD), hard disk drive (HDD), digital versatile disk (DVD), Blu-ray disk, cache, flash memory, read-only memory (ROM), random access memory (RAM), or any other storage device or storage disk associated with the processor 702 in which information may be stored for any duration (e.g., for extended time periods, permanently, for brief instances, for temporarily buffering, and/or for caching of the information). Further, although an example flowchart 400 is illustrated in FIG. 4, many other methods of implementing the content-delivery systems 104, 200 may alternatively be used. For example, the order of execution of the blocks may be changed, and/or some of the blocks described may be changed, eliminated, or combined. Additionally, or alternatively, any or all of the blocks may be implemented by one or more of a hardware circuit (e.g., discrete and/or integrated analog and/or digital circuitry), ASIC, PLD, FPGA, FPLD, logic circuit, etc. structured to perform the corresponding operation(s) without executing software or instructions.

The program 400 of FIG. 4 begins at block 402 with the content-delivery system 104, 200 waiting to detect that it is approaching a content server 120, 300 at an FBO (block 402). When a content server 120, 300 is detected (block 402), the content-delivery system 104, 200 connects to the content server 120, 300 (block 404). The content-delivery system 104, 200 (e.g., the content manager 206) obtains a customized content manifest from the content server 120, 300 (block 406). When the customized content manifest is new or changed (block 408), the content manager 206 stores the content manifest and any associated catalog files (block 410). Based on the customized content manifest, the content manager 206 removes any expired or orphaned content from the content library 102 (block 412), and creates an ordered queue of content to be loaded into the content library 102 (block 414).

If the next content item listed in the queue is not already fully loaded in the content library 102 (block 416) and there is sufficient space in the content library 102 for the next content item (block 418), the content-delivery system 104, 200 (e.g., the content loader 204) obtains the content item or the rest of the content item from the content server 120, the content source(s) 134, etc. (block 420), and stores the obtained content item in the content library 102 (block 422). The content-delivery system 104, 200 (e.g., the content distributor 210) refreshes a list of locally available content (block 424), and the content manager 206 notifies the content server 120, 300 that the content item was successfully downloaded (block 426). The content manager 206 updates the queue to represent that the content item was successfully downloaded (block 428). If the queue is empty (block 430), control exits from the example program 400.

If the queue is not empty (block 430), control returns to block 416 to consider the next content item listed in the queue.

Returning to block 418, if there is not sufficient space in the content library 102 for the next content item (block 418), control proceeds to block 428 to update the queue to skip the content item.

Returning to block 416, if the next content item in the queue is already loaded in the content library 102 (block 416), control proceeds to block 428 to update the queue to skip the content item.

Returning to block 408, if a new manifest is not received (block 408), control proceeds to block 416 to consider the next content item in the content queue (block 416).

Figure 5:
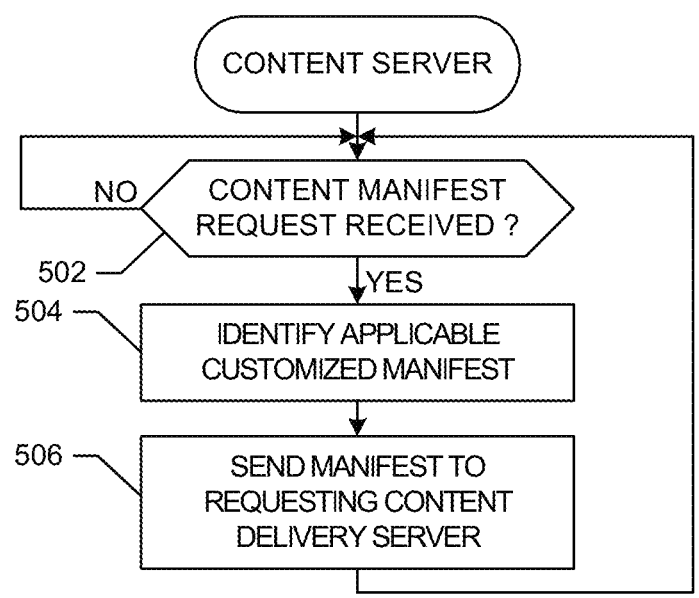
FIGS. 5 and 6 are flowcharts representative of example methods, hardware logic, machine-readable instructions, or software for implementing the example content servers of FIGS. 1 and 3, in accordance with disclosed embodiments.
Figure 6:
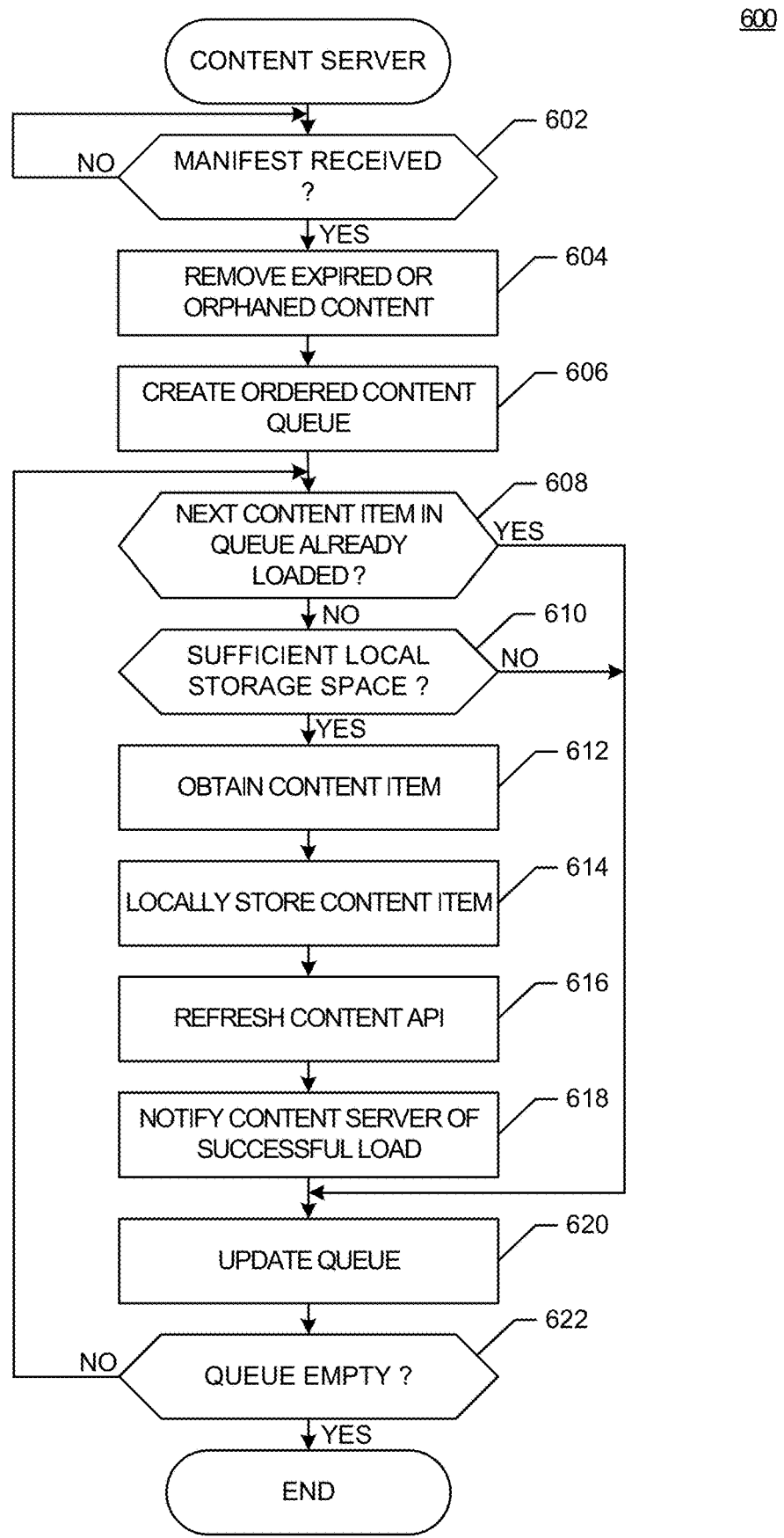

FIGS. 5 and 6 are flowcharts 500, 600 (respectively) representative of example processes, methods, software, machine-readable instructions, etc. for implementing the content server 130, 300. The processes, methods, software and instructions may be an executable program or portion of an executable program for execution by a processor such as the processor 702 of FIG. 7. The program may be embodied in software and/or machine-readable instructions stored on a non-transitory, machine-readable storage medium such as a CD, HDD, DVD, Blu-ray disk, cache, flash memory, ROM, RAM, or any other storage device or storage disk associated with the processor 702 in which information may be stored for any duration (e.g., for extended time periods, permanently, for brief instances, for temporarily buffering, and/or for caching of the information). Further, although example flowcharts 500 and 600 are illustrated in FIGS. 5 and 6, many other methods of implementing the content server 130, 300 may alternatively be used. For example, the order of execution of the blocks may be changed, and/or some of the blocks described may be changed, eliminated, or combined. Additionally, or alternatively, any or all of the blocks may be implemented by one or more of a hardware circuit (e.g., discrete and/or integrated analog and/or digital circuitry), ASIC, PLD, FPGA, FPLD, logic circuit, etc. structured to perform the corresponding operation(s) without executing software or instructions.

The program 500 of FIG. 5 begins at block 502 with the content server 120, 300 (e.g., the content manager 306) waiting to receive a request from a content-delivery system 104, 200 for a customized content manifest (block 502). When a request is received (block 502), the content manager 306 identifies a particular content manifest 308 customized, tailored, personalized, etc. for a vehicle, which can be an aircraft, itinerary, passenger, etc. associated with the content-delivery system 104, 200 (block 504), and provides the identified customized content manifest 308 to the content-delivery system 104 (block 506). Control then returns to block 502 to wait for another request.

The program 600 of FIG. 6 begins at block 602 with the content server 120, 300 (e.g., the content manager 306) waiting to receive a content manifest 308 customized, tailored, personalized, etc. by, for example, the data center 116 for a particular aircraft, itinerary, passenger, etc. (block 602). Based on the content manifests 308, the content manager 306 removes any expired or orphaned content from the content library 302 (block 604), and creates an ordered queue of content to be loaded into the content library 302 (block 606).

If the next content item listed in the queue is not already fully loaded in the content library 302 (block 608) and there is sufficient space in the content library 302 for the next content item (block 610), the content server 120, 300 (e.g., the content loader 304) obtains the content item or the rest of the content item from the content source(s) 134, etc. (block 612), and stores the obtained content item in the content library 302 (block 614). The content server 120, 300 refreshes a list of locally available content (block 616), and notifies the data center 116 that the content item was successfully downloaded (block 618). The content manager 306 updates the queue to represent that the content item was successfully downloaded (block 620). If the queue is empty (block 622), control exits from the example program 600.

If the queue is not empty (block 620), control returns to block 608 to consider the next content item listed in the queue.

Returning to block 610, if there is not sufficient space in the content library 302 for the next content item (block 610), control proceeds to block 620 to update the queue to skip the content item.

Returning to block 608, if the next content item in the queue is already loaded in the content library 302 (block 608), control proceeds to block 620 to update the queue to skip the content item.

Computing System

Figure 7:
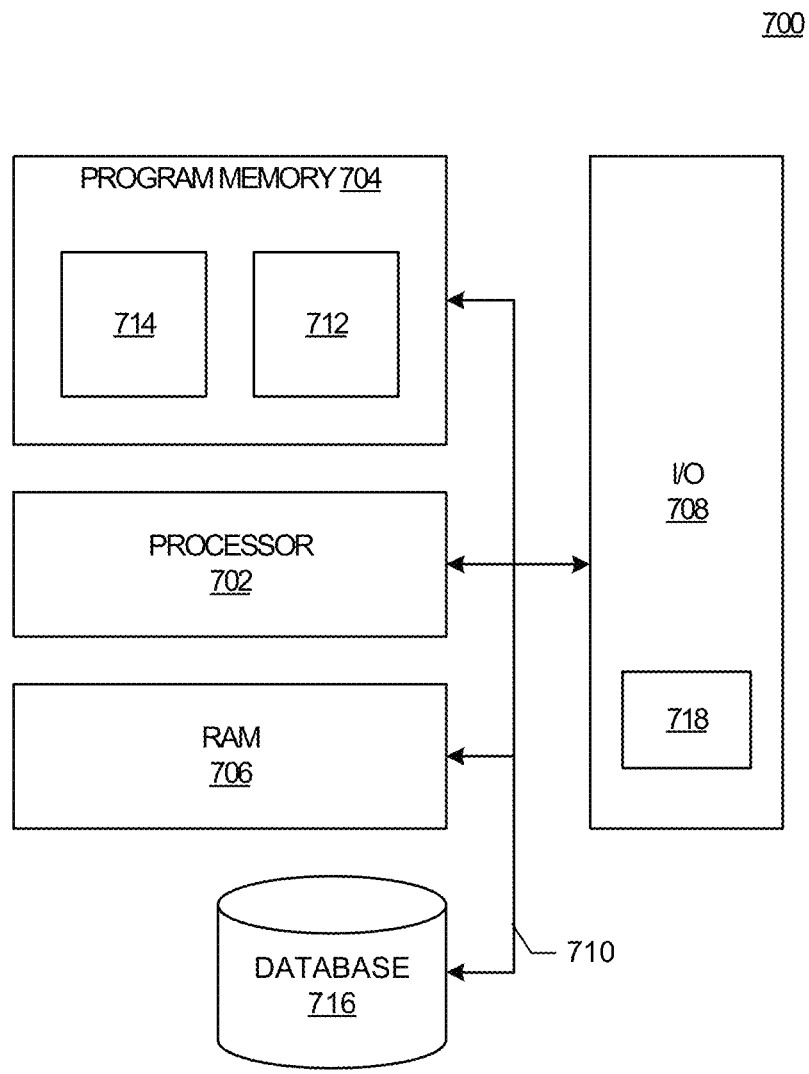
FIG. 7 is a block diagram of an example computing system to implement the various structures and methods for dynamically loading content onto in-vehicle content-delivery systems, in accordance with disclosed embodiments.

FIG. 7 is a block diagram of an example computing system 700 that may be used to implement all or part of the content-delivery system 104, 200, the content server 120, 300 and/or the data center 116. The computing system 700 may be, for example, a server, a personal computer, a workstation, or any other type of computing device or system.

The computing system 700 includes a processor 702, a program memory 704, a RAM 706, and an input/output (I/O) circuit 708, all of which are interconnected via an address/data bus 710. It should be appreciated that although FIG. 7 depicts only one processor 702, the computing system 700 may include multiple processors 702. The processor 702 of the illustrated example is hardware, and may be a semiconductor based (e.g., silicon based) device. Example processors 702 include a programmable processor, programmable controller, GPU, DSP, ASIC, PLD, FPGA, FPLD, etc.

The program memory 704 may include any number and/or type(s) of non-transitory, volatile and/or non-volatile, machine-readable storage medium, devices or disks storing software or machine-instructions that may be executed by the processor 702 to implement all or part of an operating system, the user dashboard 140, the BSG 142, the content loader 204, the content manager 206, the content distributor 210, the licensor 212, the consumer portal 214, the content loader 304 and/or the content manager 306. Modules, systems, etc. instead of and/or in addition to those may be implemented. The software or machine-readable instructions may be stored on separate non-transitory, machine-readable storage mediums, devices or disks, and/or at different physical locations.

Example memory 704 includes any number and/or type(s) of volatile or non-volatile, non-transitory, machine-readable storage medium, devices or disks, such as a semiconductor memory, magnetically readable memory, optically readable memory, HDD, SSD, ROM (e.g., a ROM 712), RAM (e.g., a RAM 714), redundant array of independent disks (RAID) system, cache, flash memory, or any other storage medium, device or disk in which information may be stored for any duration (e.g., permanently, for an extended time period, for a brief instance, for temporarily buffering, for caching of the information, etc.).

As used herein, the term non-transitory, machine-readable storage medium is expressly defined to include any type of non-transitory, machine-readable storage device and/or storage disk and to exclude propagating signals and to exclude transmission media.

In some embodiments, the processor 702 may also include, or otherwise be communicatively connected to, a database 716 or other data storage mechanism (one or more of a HDD, optical storage drive, solid state storage device, CD, CD-ROM, DVD, Blu-ray disk, RAID, etc.). In the illustrated example, the database 716 may store any of the content library 102, the content 202, the manifest 208, the content library 302 and/or the manifests 308.

Although FIG. 7 depicts the I/O circuit 708 as a single block, the I/O circuit 708 may include a number of different types of I/O circuits or components that enable the processor 702 to communicate with peripheral I/O devices and/or other computing systems. Example interface circuits 708 include a USB interface, Bluetooth® interface, near field communication (NFC) interface, infrared interface and/or PCI express interface. The peripheral I/O devices may be any desired type of I/O device such as a keyboard, display (e.g., a liquid crystal display (LCD), cathode ray tube (CRT) display, light emitting diode (LED) display, organic light emitting diode (OLED) display, active-matrix organic light-emitting diode (AMOLED) display, in-place switching (IPS) display, touch screen, etc.), navigation device (e.g., a mouse, trackball, capacitive touch pad, joystick, etc.), speaker, microphone, printer, button, communication interface, antenna, etc. The I/O circuit 708 typically includes a graphics driver card, graphics driver chip and/or graphics driver processor to drive a display when a display is present.

The I/O circuit 708 may include a number of different network transceivers 718 that enable the computing system 700 to communicate with other computing systems via, e.g., a network such as the Internet. The network transceiver 718 may be a Wi-Fi transceiver, cellular transceiver, Ethernet network transceiver, asynchronous transfer mode (ATM) network transceiver, digital subscriber line (DSL) modem, dialup modem, satellite transceiver, cable modem, etc.

Additional Considerations

Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way, but may also be configured in ways that are not listed.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The embodiments are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification, specific embodiments have been described. However, one of ordinary skill in the art appreciates that various modifications and changes can be made in view of aspects of this disclosure without departing from the scope of the invention as set forth in the claims below. Accordingly, the specification and figures are to be regarded in an illustrative rather than a restrictive sense, and all such modifications made in view of aspects of this disclosure are intended to be included within the scope of present teachings.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system for dynamically loading content to an in-vehicle content-delivery system for distribution on a vehicle, the system comprising:
   an in-vehicle content-delivery system storing a library of content; and
   a content server including a content portal, wherein the content portal is configured to:
      receive a request for a customized content manifest from the in-vehicle content-delivery system;
      identify the vehicle;
      identify a customized content manifest for an itinerary for the vehicle and/or the vehicle, wherein the customized content manifest includes a list of content, wherein the customized content manifest is customized for the itinerary and/or the vehicle, and wherein the customized content manifest differs from another content manifest customized for a different itinerary and/or a different vehicle; and
      provide the customized content manifest to the in-vehicle content-delivery system,
   wherein the in-vehicle content-delivery system is configured to:
      remove first content from the library of content when the first content is not included in the list of content; and
      load second content to the library of content when the second content is included in the list of content and not already present in the library of content; and
   wherein the content server is configured to notify maintenance personnel a software update is loaded into the library of content and is ready to be installed in the vehicle or in a system of the vehicle when the second content includes the software update.

2. The system of claim 1, wherein the in-vehicle content-delivery system is configured to notify the content server when the second content is successfully loaded to the library of content.

3. The system of claim 1, wherein the list of content includes third content, wherein the customized content manifest includes content priorities, and wherein the in-vehicle content-delivery system is configured to install the second and third content to the library of content in an order that is based on the content priorities.

4. The system of claim 1, wherein the content server further includes a content loader configured to preload the second content to the content server, and wherein the in-vehicle content-delivery system is configured to load the second content from the content server.

5. The system of claim 1, wherein the in-vehicle content-delivery system is configured to load the second content from a content source identified in the list of content.

6. The system of claim 1, further comprising a data center configured to:
   receive one or more content selections;
   identify the vehicle and/or the itinerary for the vehicle;
   identify the customized content manifest for the vehicle and/or the itinerary; and
   update the customized content manifest based upon the one or more content selections.

7. The system of claim 6, wherein the data center is configured to provide the customized content manifest to the content server.

8. The system of claim 1, wherein the second content includes configuration data, and wherein the content server is configured to notify the maintenance personnel when the configuration data is loaded into the library of content and is ready to be applied to the vehicle or to a system of the vehicle.

9. The system of claim 1, wherein the second content includes at least one of a magazine, a news feed, web data, an application, audio content, video content, or multimedia content.

10. A computer-implemented method for dynamically loading content to an in-vehicle content-delivery system for distribution on a vehicle, the method comprising:
   receiving, via a network, a request for a customized content manifest from an in-vehicle content-delivery system on a vehicle;
   identifying, using one or more processors, the vehicle;
   identifying, using the one or more processors, a customized content manifest for an itinerary for the vehicle and/or the vehicle, wherein the customized content manifest includes a list of content, wherein the customized content manifest is customized for the itinerary and/or the vehicle, and wherein the customized content manifest differs from another content manifest customized for a different itinerary and/or different vehicle; and providing, via the network, the customized content manifest to the in-vehicle content-delivery system, wherein the in-vehicle content-delivery system is configured to remove first content from a library of content stored on the vehicle when the first content is not included in the list of content, and load second content to the library of content when the second content is included in the list of content and not already loaded to the in-vehicle content-delivery system; and wherein the method further includes notifying maintenance personnel a software update is loaded by the in-vehicle content-delivery system into the library of content and is ready to be installed in the vehicle or in a system of the vehicle in response to the second content including the software update.

11. The method of claim 10, further comprising receiving notifications from the in-vehicle content-delivery system when the second content is successfully loaded to the in-vehicle content-delivery system.

12. The method of claim 10, wherein the list of content includes third content, and wherein the customized content manifest includes content priorities that represent an order in which the in-vehicle content-delivery system is to load the second and third content.

13. The method of claim 10, further comprising:
preloading the second content to a content server; and
loading the second content to the in-vehicle content-delivery system from the content server.

14. The method of claim 10, wherein the list of content identifies a content source for the second content.

15. The method of claim 10, further comprising:
receiving one or more content selections; and
updating the customized content manifest based upon the one or more content selections.

16. The method of claim 10, wherein the second content includes configuration data, and wherein the method further includes notifying the maintenance personnel when the configuration data is loaded by the in-vehicle content-delivery system into the library of content and is ready to be installed in the vehicle or in a system of the vehicle.

17. A non-transitory computer-readable medium storing instructions that, when executed by one or more processors, cause a system to:
receive, via a network, a request for a customized content manifest from an in-vehicle content-delivery system on a vehicle;
identify the vehicle;
identify a customized content manifest for an itinerary for the vehicle and/or the vehicle, wherein the customized content manifest includes a list of content, wherein the customized content manifest is customized for the itinerary and/or the vehicle, and wherein the customized content manifest differs from another content manifest customized for a different itinerary and/or different vehicle; and provide, via the network, the customized content manifest to the in-vehicle content-delivery system, wherein the in-vehicle content-delivery system is configured to remove first content from a library of content stored on the vehicle when the first content is not included in the list of content, and load second content to the library of content when the second content is included in the list of content and not already loaded to the in-vehicle content-delivery system; and wherein the instructions, when executed by the one or more processors, further cause the system to notify maintenance personnel a software update is loaded by the in-vehicle content-delivery system into the library of content and is ready to be installed in the vehicle or in a system of the vehicle when the second content includes the software update.

18. The non-transitory computer-readable medium of claim 17, wherein the list of content includes third content, and wherein the customized content manifest includes content priorities that represent an order in which the second and third content are to be loaded.

19. The non-transitory computer-readable medium of claim 17, wherein the second content includes configuration data, and wherein the instructions, when executed by the one or more processors, further cause the system to notify the maintenance personnel when the configuration data is loaded by the in-vehicle content-delivery system into the library of content and is ready to be installed in the vehicle or in a system of the vehicle.

20. The system of claim 1, wherein the in-vehicle content-delivery system is configured to:
create a queue of content to be loaded into the library of content; and
if there is not sufficient space in the content library for a next content item in the queue, update the queue to skip a present content item.

* * * * *